Aug. 2, 1932.  L. D. MENNELL ET AL  1,869,606

FLOWERPOT

Filed Dec. 2, 1930

INVENTOR.
Lee D. Mennell and
Wheeler Lafferty

BY Ray Oberlin & Ray
ATTORNEYS.

Patented Aug. 2, 1932

1,869,606

UNITED STATES PATENT OFFICE

LEE D. MENNELL, OF CLEVELAND, AND WHEELER LAFFERTY, OF LAKEWOOD, OHIO

FLOWERPOT

Application filed December 2, 1930. Serial No. 499,476.

Our invention relates, as indicated, to flower pots, and more particularly to a drainage device for such. The present means for draining the ordinary flower pot is by a single hole in the center of the bottom of the pot. Experience has shown that clogging in the ordinary flower pot is a common occurrence due to the inadequacy of the single hole which packs with dirt carried off when the contents are watered. Also, when the ordinary flower pot is lifted, dirt is easily spilled out of the hole as there is no device for preventing such in the present arrangement. To prevent clogging and the dropping out of the dirt, it is now necessary to keep around the greenhouse, or any place where a number of pots is required, a supply of small pieces of broken pots called potsherds to be placed in the bottom of the pot above the hole, causing trouble and waste of time. Furthermore, the use of potsherds is not conducive to the uniform growth of any crop due to the fact that the drainage when such are used is not even.

Our invention aims to provide a pot in which adequate drainage is provided while maintaining that simplicity of structure necessary to economy of manufacture and to facility of handling the pots, stacking them, and carrying out the usual potting operations of a commercial greenhouse. It will be understood that such pots are usually made of unglazed clay, and the preferred embodiment is described with reference to that material, although the principles of the invention are equally applicable to other materials of all costs, such as glazed clay, ornamental pottery, molded fiber, stamped metal, and so on. To the accomplishment of the foregoing and related ends, said invention, then, consists of the means hereinafter fully described and particularly pointed out in the claims.

The annexed drawing and the following description set forth in detail a device embodying the invention, such disclosed means constituting, however, but one of various forms in which the principle of the invention may be used.

Figure 1:
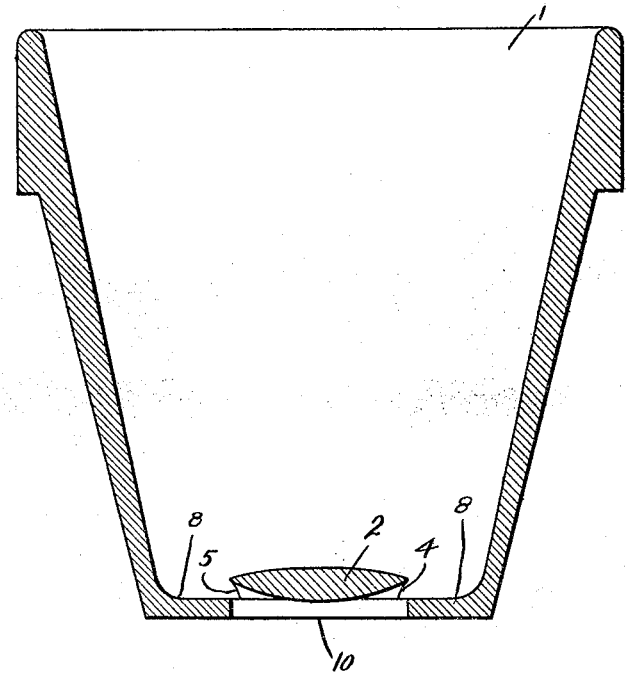
Figure 2:
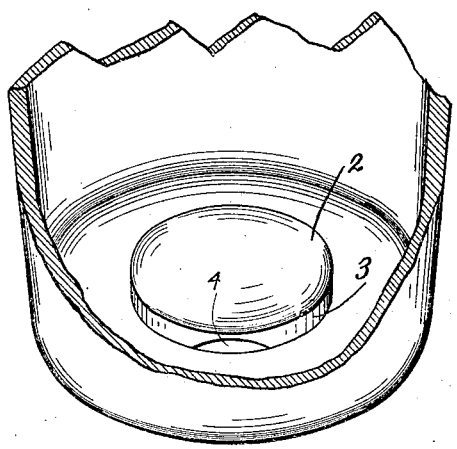
Figure 3:
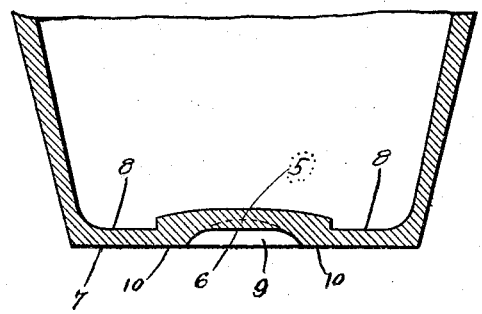

In said annexed drawing:

Fig. 1 is a central vertical section through the flower pot; Fig. 2 is a perspective view of the bottom interior of the flower pot with its sides broken away; Fig. 3 is a central vertical section of the bottom of the flower pot on a plane perpendicular to Fig. 1.

Our device, in the preferred embodiment here described, consists of a cap or disc 2 raised inwardly from the bottom of the flower pot and having slots 4 and 5 therein, the cap or disc forming an integral part of the flower pot. Figs. 1 and 2 show the disc 2 raised inwardly from the bottom over what would be the hole in the bottom of the ordinary pot. The upper surface of this disc or cap 2 is flat or slightly convex, and for purposes of illustration may be taken to be of a height approximately equal to the thickness of the bottom. The major portion of the disc is of about the same thickness as the bottom of the pot, and is practically an inward displacement of a part of the bottom. The pot and disc form one solid piece of pottery, there being no break between the disc and the bottom interior of the top. The foundation 10 of the disc, as shown in Fig. 3, extends through what would be an enlarged hole in the ordinary flower pot, partially filling such hole at the sides of an exterior groove hereinafter explained. The drainage slots 4 and 5 are eye-shaped and are disposed laterally in the disc, and their height or vertical opening is approximately from the upper surface 8 of the bottom of the pot, up nearly to the top of the side 3 of the disc 2, leaving the edge portions of the disc above such slots of sufficient thickness to prevent crumbling, as shown in Fig. 2. The length of the slot will vary with the size of the flower pot, but for purposes of illustration may be taken to be roughly an eighth of the disc circle. These slots are in the opposite sides of the disc, as shown in Fig. 1, and the most desirable arrangement is two slots, although the invention is not confined to any particular number.

After the water drains through the slots 4 and 5, drainage is further facilitated by a groove 6 in the bottom of disc 2, as shown in Fig. 3. This groove 6 is slightly wider than the slots and in effect is a continuation of them, extending the whole distance across the bottom of the disc directly between the slots 4 and 5. This groove 6 makes a hollow portion 9, as seen in Fig. 3, which is ample to take care of the drainage of water and dirt passing through the slots when the flower pot is placed on a flat surface. This groove also tends to prevent clogging in the slots by the dirt washed out, or by dirt picked up when the pot is set down, as is so frequent when the ordinary pot with the single hole in the bottom is placed on a flat drainage surface, as a littered shelf, or on the ground.

Among the advantages of our invention may be mentioned the elimination of the necessity for the use of potsherds as at present employed, thereby enabling the user of this flower pot to save much time when potting. Further, the disc or cap will not clog or stop up, thus preventing the formation of what is known among florists as a water logged pot ball. Also, being a pot with a permanent cap, the drainage in all pots will be equal and uniform, tending toward a more uniform growth of any plants for which they are employed. In addition to these advantages, the design of this cap or disc is convenient in that it enables the pot to be made on the ordinary spinning die, which die need not be altered in any of its essential features. Further, this pot can be manufactured so economically as to be sold at only slightly increased cost.

Other modes of applying the principle of our invention may be employed instead of the one explained, change being made as regards the device herein disclosed, provided the means stated by any of the following claims or the equivalent of such stated means be employed.

We therefore particularly point out and distinctly claim as our invention:

1. A flower pot having an integral drainage disc raised inwardly from the bottom of the pot, said disc having laterally disposed slots oppositely spaced in the sides thereof, an inner edge of the pot bottom forming the lower edge of each slot.

2. In a flower pot, a central bottom portion elevated above the general bottom level, said elevated portion being connected to said bottom at intervals and disconnected upwardly from said bottom at intermediate intervals.

3. In a flower pot, a bottom portion elevated above the general bottom level but formed integrally therewith, said bottom portion being thinned upwardly at intervals, thereby forming apertures between the bottom and the bottom portion.

4. A plastic integral flower pot bottom construction comprising an elevated central disc connected to the bottom at intervals, breaks in said connection forming lateral drainage openings, said disc overlying the tops of said openings.

5. A flower pot having in the bottom thereof an inwardly disposed projection, and laterally disposed openings between said projection and the upper surface of an inner edge of the pot bottom.

6. An integral molded flower pot having a drainage disc raised inwardly from the bottom of the pot, said disc having laterally disposed slots between the disc sides and the pot bottom.

7. An integral molded flower pot of clay or the like having a bottom including a drainage disc of the general bottom thickness, raised approximately its own thickness above the general bottom level, and separated from the rest of the bottom at intervals around its edges.

8. An integral molded flower pot bottom having a drainage disc raised therefrom and separated from the pot bottom at intervals along its edges by slots defined by separation of the lower surface of the disc from the upper surface of the bottom.

9. A flower pot of clay or the like having a raised disc centrally disposed in the bottom and drainage openings between the disc and the general bottom surface of the pot, said disc and openings being made by axial displacement of the clay while soft.

Signed by me this 26 day of November, 1930.

LEE D. MENNELL.

Signed by me this 28 day of November, 1930.

WHEELER LAFFERTY.